United States Patent Office 3,107,979
Patented Oct. 22, 1963

3,107,979
MANUFACTURE OF SULFURYL FLUORIDE
Louis G. Anello, Parsippany, and Cyril Woolf, Morristown, N.J., assignors to Allied Chemical Corporation, New York, N.Y., a corporation of New York
No Drawing. Filed Dec. 23, 1960, Ser. No. 77,807
5 Claims. (Cl. 23—203)

This invention relates to processes for making sulfuryl fluoride, $SO_2F_2$, a known compound having a boiling point of about minus 51° C., and useful as a fumigant.

A major object of the present invention lies in the provision of a solid catalyst, gas-phase method for making sulfuryl fluoride by reaction of sulfur dioxide and certain nitrogen-oxygen-fluorine compounds.

In accordance with the invention it has been found that sulfur dioxide may be reacted conveniently with nitrosyl fluoride, NOF, or with a nitrosyl fluoride-hydrogen fluoride complex, namely NOF.3HF, or mixtures of both, to form sulfuryl fluoride. We find that activated carbon possesses properties such as to efficiently promote the reaction at practicably moderate elevated temperatures, thus providing an easily controllable all gas-phase reaction in accordance with which sulfuryl fluoride may be made in good yields. Activated carbon promotes the reaction at substantially atmospheric pressure, and further it has been found that the activated carbon as catalyst shows no discernible tendency, when employed under conditions indicated herein, to promote undesirable side reactions.

Reactions involved in the practice of the invention may be represented by—

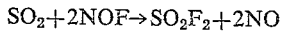
$$SO_2 + 2NOF \rightarrow SO_2F_2 + 2NO$$

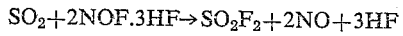
$$SO_2 + 2NOF.3HF \rightarrow SO_2F_2 + 2NO + 3HF$$

Nitrosyl fluoride, NOF, is a known and available normally colorless gas material having a boiling point of about minus 56° C. Nitrosyl fluoride may be made, as known, by passing nitrosyl chloride over silver fluoride in a platinum tube at elevated temperatures, or by direct reaction of nitric oxide and elemental fluorine. The nitrosyl fluoride-hydrogen fluoride complex, NOF.3HF, utilized as a reactant in accordance with the present invention, may be made by reaction of nitrosyl chloride and anhydrous HF, for example as follows.

The reactor employed was an unpacked nickel tube 1″ I.D. x 36″ long mounted in an electrically heated furnace 30″ long. Throughout the run, the reactor was heated to about 60° C. During a period of about 4 hours, a vaporous mixture consisting of about 11.3 mols (226 g.) of HF and about 1.82 mols (118 g.) of NOCl was passed into the reactor. Ratio of HF to NOCl was about 6 to 1, and reaction contact time was about 18 sec. Products exiting the reactor were passed into the bottom of a 1 inch by 2 foot vertically disposed nickel still packed with nickel "Heliopak," and provided at the top with a reflux condenser cooled by a Dry Ice-acetone mixture. The HCl formed passed through the reflux and was absorbed by a water scrubber located after the still. All other materials exiting the reactor were condensed and held in the still during the run. On completion of the run, the condensate thus collected was distilled and there were recovered about 45 gms. (0.69 mol) of a fraction boiling in the range of minus 5 to zero degrees C. and comprising mostly NOCl; about 86 gms. (4.3 mols) of a fraction boiling in the range of 17–20° C. and comprising mostly HF; about 60 gms. of a fraction boiling in the range of 63–69° C.; and about 96 gms. of a pot residue boiling above about 70° C. The 63–69° C. fraction was redistilled and had a boiling point of about 68° C., and was liquid NOF.6HF complex. The pot residue fraction on redistillation showed a boiling point of about 95° C., and was liquid NOF.3HF complex. The NOF.6HF complex pyrolyzes at about 77–81° C. to HF and NOF.3HF complex. Hence, the mixture collected in the still after refluxing and at completion of the run as noted above, may be converted wholly to the NOF.3HF complex by heating to say 90° C. Further, it will be understood that when the material is heated sufficiently to convert all of the same to vaporous form, all complex of the vapor is the NOF.3HF, i.e. at temperature above 95° C. (atmospheric pressure), all of the complex exists as NOF.3HF.

The activated carbon catalysts which may be used in practice of the invention are granular materials readily available from several commercial sources, suitable materials being various grades of activated carbon such as Columbia 6G, Columbia SW, and Darco. Granular size of the activated carbon employed is not highly critical. Ordinarily, reaction is carried out in elongated tubular reactors, and in these instances it is desirable to employ activated carbon granules of average mesh size between 1/25 and 1/4 of the reactor diameter, and better conditions are those in which a reactor is substantially completely filled with granules of average mesh size of about 1/8 or 1/10 of the diameter dimension of the reactor.

Nitrosyl fluoride may be available in liquid or gas form. The NOF.3HF complex is usually initially in the form of a liquid which, if all NOF.3HF complex, boils at about 95° C. However, the NOF.3HF complex may be initially available in the form of a mixture of NOF.3HF and NOF.6HF, as above described, and at temperature of say 90° C. and up all NOF.6HF complex becomes converted to the NOF.3HF complex, so that in practice of the present invention, the nitrogen-oxygen-fluorine compound fed in vapor form is all the NOF.3HF complex. As also noted above, the nitrosyl fluoride-hydrogen fluoride complexes may be made up by reaction of nitrosyl chloride and anhydrous HF. Hence, instead of charging the nitrosyl fluoride-hydrogen fluoride compound into the reaction zone as NOF.3HF, equivalent amounts of nitrosyl chloride and anhydrous HF may be employed and, unless otherwise indicated, notation herein of use of NOF.3HF or NOF.6HF complexes is intended to include equivalent amounts of nitrosyl chloride and anhydrous HF.

General practice of the invention process comprises introducing into a reaction zone gaseous sulfur dioxide and gaseous fluoride material of the group consisting of NOF and NOF.3HF complex, heating the sulfur dioxide and the complex material in the reaction zone at certain elevated temperatures and while in the presence of activated carbon, and discharging from the reaction zone products containing sulfuryl fluoride. The process may be carried out by continuously passing metered mixtures of sulfur dioxide, and NOF or NOF.3HF or mixtures of both into and thru a suitable tubular reactor containing activated carbon mounted in an electrically heated furnace, and connected to a product recovery system. The reactor and other equipment may be made of e.g. nickel, Monel or Inconel, or other material corrosive-resistant to reactants and the products formed.

Significant reaction may proceed at temperatures as low as about 125° C. Although temperatures higher than 600° C. do not substantially adversely affect reaction, temperatures above 600° C. afford no substantial advantage. Experience shows that for best results, temperatures substantially in the range of 325–475° C. are preferred, about 400° C. being a usual operating temperature for continuous operation.

While sub- or super-atmospheric pressures may be employed, the invention affords the advantage of operation at substantially atmospheric pressure. It will be understood that in the practice of gas-phase catalytic processes of the general type described herein, i.e. processes in which a gas stream is flowed successively thru reaction and product recovery systems, for all practical purposes, as relate to reactions themselves, pressure is considered as being substantially atmospheric. Technically, however, pressures in such systems are sufficiently on the positive side to effect commercially satisfactory gas flow thru the apparatus train. Thus, strictly speaking, depending upon factors such as apparatus design, mesh size of catalyst, unpacked gas space in the reactor, desired contact time, etc., actual pressures in systems of the kind under consideration may vary from 2 up to say 10–15 pounds' gauge, and accordingly operations of this type are included in the designation of substantially atmospheric pressure.

With regard to mol ratio of $SO_2$ to the nitrogen-oxygen-fluoride compound, whether NOF or the NOF.3HF complex, theoretical requirements are approximately one mol of $SO_2$ to two mols of nitrogen-oxygen-fluorine compound. Less than theoretical quantities of the latter may be employed, but to no advantage and such proportioning of reactants is not preferred. It has been found that good results are obtained when the reactor feed is regulated so as to contain at least two molecular proportions of NOF or NOF.3HF complex per mol $SO_2$. More desirably, molecular excesses of NOF or NOF.3HF are utilized, and best results are obtainable when the mol ratio of sulfur dioxide to NOF or NOF.3HF complex is substantially in the range of 1:2–1:2.5.

Contact time may be varied considerably without noticeable disadvantage to high process efficiency. Generally, increasing contact time and reactor temperature results in higher reactivity. Significant conversions are effected at contact times as short as 5 seconds. However, contact times usually may lie in the range of 15 seconds up to say five minutes. To a substantial extent, contact time, reactor temperature and ratio of reactants are interrelated, and depending upon apparatus and the particular operation at hand, optimum conditions as to contact time may be determined by test runs.

Product recovery may be effected more or less conventionally as in this art. When the NOF.3HF complex is used, the reactor exit contains sought-for sulfuryl fluoride, nitride oxide (NO), HF, and possibly some unreacted $SO_2$ and/or NOF.3HF. The reactor exit may be fed thru a water scrub tower to remove HF and NOF.3HF from the gas stream. The latter, as discharged from the water scrubber, may be passed thru a relatively weak e.g. 10% NaOH solution to remove any unreacted $SO_2$. After drying, by desiccants such as Drierite or calcium chloride, the dried gas stream then may be fed into a cold trap refrigerated as by a Dry Ice-acetone mixture. Sulfuryl fluoride is condensed, and NO is discharged from the system. Condensate in the trap may then be suitably fractionally distilled to recover sulfuryl fluoride in substantially pure form. Should nitrosyl chloride and HF be used in place of the NOF.3HF complex, the reactor exit may be substantially the same as indicated except for the additional presence of HCl which may be taken out by the water scrubber.

The following illustrates practice of the invention.

*Example 1.*—The reactor employed consisted of a 1" I.D. 36" long nickel tube mounted in an electrically heated furnace enveloping about 30" of the reactor. The latter was provided at one end with valved inlets arranged to facilitate separately metered feed of $SO_2$ and NOF.3HF complex, both in gas form. The opposite end of the reactor had a gas outlet connected to a water scrubber. The reactor was partly filled with activated carbon (commercially available Columbia 6G grade) sized such as to provide granules of average mesh size of about ⅛ of the reactor diameter, the carbon occupying a volume of about 450 cc. in the heated section of the reactor. Nitrosyl fluoride-hydrogen fluoride complex (made as above described) was vaporized and the resulting NOF.3HF vapor and gaseous $SO_2$ were charged into the reactor. Throughout the run, temperatures in the reactor were maintained in the range of about 375–550° C., and contact time was about 30 seconds. Products discharged from the reactor were passed thru a water scrubber to remove some HF and unreacted NOF.3HF. The scrubber exit was dried, and the dried gas stream was run into a cold trap cooled by a Dry Ice-acetone mixture. Nitric oxide was discharged thru the trap, while other constituents of the gas were totally condensed. The cold trap was permitted to warm up to within the range of about minus 52-minus 50° C. and, by infrared absorption spectrum and gas chromatography, the overhead was established to be sulfuryl fluoride, $SO_2F_2$.

*Example 2.*—Apparatus and catalyst employed were the same as in Example 1. Over a period of about 4 hours, about 1.2 mols (76 g.) of gaseous $SO_2$ and about 2.85 mols (400 g.) of gaseous NOF.3HF (same derivation as in Example 1) were passed into and thru the reactor. Throughout the run, temperature in the reactor was maintained at about 400° C. Contact time was about 30 seconds. Products leaving the reactor were scrubbed in a water trap which removed any unreacter NOF.3HF and possibly some HF, and the exit of the water scrubber was run thru a 10% caustic solution to remove any unreacted $SO_2$. After drying, the total gas stream, with the exception of the NO content was condensed in a Dry Ice-acetone trap. The condensate in the trap was fractionally distilled and there was recovered about 50 grams, 0.49 mol of material identified by infrared absorption spectrum and gas chromatography to be $SO_2F_2$. The $SO_2F_2$ recovered represented a yield of about 41% of theory.

The herein outlined method for making NOF.3HF and NOF.6HF complexes, from nitrosyl chloride and HF, is more fully described and claimed in our copending application Serial No. 77,805, filed December 23, 1960.

We claim:

1. The process for making sulfuryl fluoride which comprises introducing into a reaction zone reactants consisting of gaseous sulfur dioxide and gaseous nitrosyl fluoride material, said material being selected from the group consisting of NOF and NOF.3HF complex, heating said sulfur dioxide and said material in said zone to temperatures substantially in the range of 125–600° C. while in the presence of activated carbon, and discharging from said zone reaction products containing sulfuryl fluoride.

2. The process for making sulfuryl fluoride which comprises introducing into a reaction zone reactants consisting of gaseous sulfur dioxide and gaseous NOF.3HF complex, heating said sulfur dioxide and said complex in said zone to temperatures substantially in the range of 125–600° C. while in the presence of activated carbon, and discharging from said zone reaction products containing sulfuryl fluoride.

3. The process of claim 1 in which temperatures are substantially in the range of 325–475° C.

4. The process for making sulfuryl fluoride which comprises introducing into a reaction zone reactants consisting of gaseous sulfur dioxide and at least two molecular proportions of NOF.3HF complex, heating said sulfur dioxide and said complex in said zone to temperatures substantially in the range of 125–600° C. while in the presence of activated carbon, and discharging reaction products from said zone, and recovering sulfuryl fluoride from said products.

5. The process for making sulfuryl fluoride which comprises introducing into a reaction zone reactants consisting of gaseous sulfur dioxide and gaseous NOF.3HF complex, mol ratio of sulfur dioxide to complex being substantially in the range of 1:2–1:2.5, heating said sulfur dioxide and said complex in said zone to temperatures substantially in the range of 325–475° C. while in the presence of activated carbon, and discharging reaction products from said zone, and recovering sulfuryl fluoride from said products.

References Cited in the file of this patent

UNITED STATES PATENTS 2,772,144     Belf _____ Nov. 27, 1956

OTHER REFERENCES

Inorganic Syntheses, vol. VI, Roehow, page 158 (1960), McGraw-Hill, Sulfuryl Fluoride, Muetterties.

Progress in Inorganic Chemistry, vol. II, Cotton, 1960, page 80, Sulfuryl Compounds, J. W. George.

Fluorine Chemistry, Simons, vol. 1, pages 89, 93, 94, 1950.

Partington: A Textbook of Inorganic Chemistry, 1950, page 545.

Bailar: Inorganic Syntheses, vol. IV, pages 136–137.

Seel et al.: Z. Anorg. Chem., vol. 274, pages 197, 202.

Seel et al.: Z. Anorg. Chem., vol. 280, page 186.